Jan. 22, 1957     O. KLEPP     2,778,626

TORSION SPRING ASSEMBLY

Filed June 8, 1954

INVENTOR.
OTTO KLEPP
BY

United States Patent Office 2,778,626
Patented Jan. 22, 1957

2,778,626
TORSION SPRING ASSEMBLY
Otto Klepp, Vienna, Austria

Application June 8, 1954, Serial No. 435,252

Claims priority, application Austria June 17, 1953

6 Claims. (Cl. 267—1)

The invention relates to a torsion spring assembly whose spring group consisting of several spring rods or spring leaves is gripped at the ends in two rings, one of which is firmly connected to one end of a lever arm hub longitudinally embracing the entire spring group whereas the other ring is rotatably mounted in that lever arm hub and is connected for joint rotation to one limb of a U-shaped hub of a second lever arm, at least one of said two levers rocking about the axis formed by the spring group and thus twisting the spring group. In known structures of that type the second limb of the U-shaped hub of the lever arm is rotatably mounted by means of an additional bearing ring directly in the hub of the second lever arm. This increases the overall length of the torsion spring assembly and renders its assembling more complicated. Moreover, the U-shaped end of the lever arm must be substantially adapted in its bearing arrangement to the hub of the other lever.

According to the invention this known torsion spring assembly is simplified and improved thereby that each of the two levers is rigidly fixed with its hub to one of the two rings embracing the torsion spring group at its ends as anchoring and bearing means, whereas the lever is rotatably mounted at the other ring so that both levers are connected to both rings firmly embracing the spring group ends and are connected only by the spring group, which forms their common pivot axis, so that the levers are relatively rotatable but nondisplaceable in the axial direction. Thus the torsion spring assembly is restricted substantially to the length of the spring group and all additional bearing parts are eliminated.

Figure 1:
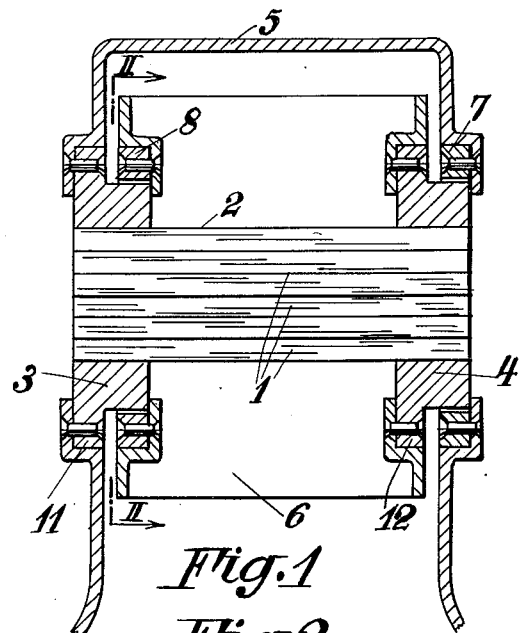
Figure 2:
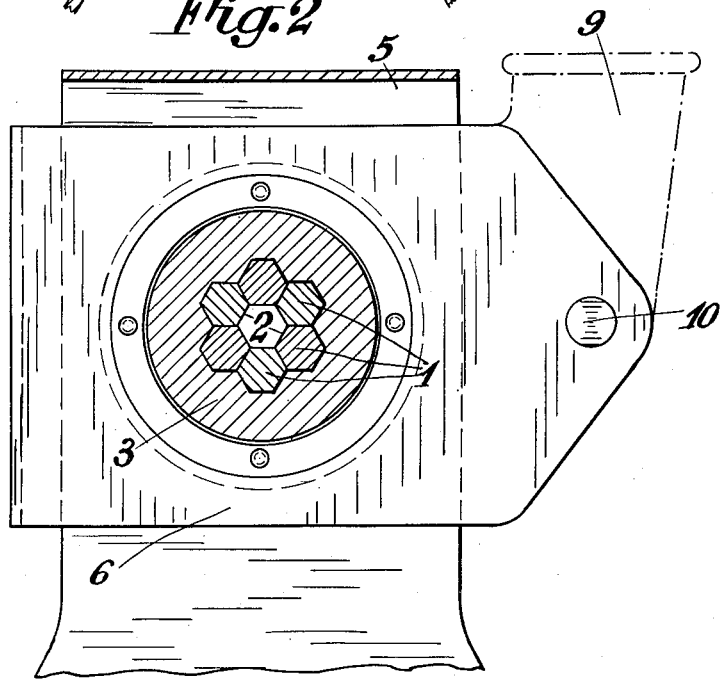

In the accompanying drawing an illustrative embodiment of the torsion spring assembly is shown in Figs. 1 and 2 in horizontal and transverse sectional views, respectively.

As is shown in Figs. 1 and 2, round or triangular, quadrangular, hexagonal or polygonal rods 1, or leaf springs, can be held together firmly at the ends by rings 3 and 4, respectively, each of which has a prismatic aperture, so that the springs form a group 2. Each of the rings 3, 4 has a flange 11 or 12, respectively, with angularly spaced holes for receiving rivets or the like. In this illustrative embodiment the two levers 5 and 6 are U-shape adjacent to their hubs. The U-shaped hub of lever 5 embraces with a clearance the U-shaped hub body of lever 6 so that the two levers are fitted one in the other without mutual contact. The ring 3 is riveted with its flange 11, e. g. to one limb of lever 5, whereas this lever 5 is rotatably mounted with its second limb at the ring 4 by means of a bearing insert 7. On the other hand, the ring 4 is rigidly fixed with its flange 12 to one limb of the U-shaped hub of lever 6, which is rotatably mounted with its second limb to the ring 3, with the bearing insert 8 interposed. Thus the two levers 5 and 6 are connected only by the rings 3, 4 to the spring group 2, which is their rocking axis held by the levers to resist flexion but to absorb torsional stress. In the illustrative embodiment shown the lever 6 is articulated through pin 10 to a part 9 of a motorcycle seat whereas lever 5 is rigidly fixed to the frame of the motorcycle.

Similarly the seats arranged within vehicles can be provided with the spring assembly according to the invention to cushion them relative to the floor of the vehicle. The spring assembly may be formed also as a freely swinging joint of two levers and can be used as a car spring with the special advantage that the chassis can be much lower than with the previously known spring suspension.

From the foregoing description and the drawings it is apparent that the torsion spring assembly comprises a torsion spring member 2, which is of out of round cross section at least at its ends and consists of nested parallel spring elements 1. The assembly further comprises a first bushing 3 and a second bushing 4, which have axial apertures conforming to the out of round cross section of the ends on the spring member 2. The bushings 3 and 4 are fast on mutually opposite ends of the spring member 2 and hold the spring elements 1 together. Each of the bushings 3 and 4 comprises a peripheral cylindrical bearing portion (shown on the right side of the bushings in Fig. 1) and a peripheral fixing portion adjacent to the bearing portion. The bearing and fixing portions of the bushings 3 and 4 surround the spring member 2.

The spring assembly further comprises two lever means 5 and 6, each of which comprises two limbs connected for joint pivotal movement. The lever means 5 is non-rotatably connected with one of its limbs to the fixing portion of bushing 3 and is mounted for rotation with the other of its limbs on the bearing portion of bushing 4. The lever means 6 is non-rotatably connected with one of its limbs to the fixing portion of bushing 4 and is mounted for rotation with the other of its limbs on the bearing portion of bushing 3.

In addition, the lever means 5 engages the axially outwardly facing sides of bushings 3 and 4 and the lever means 6 engages the axially inwardly facing sides of bushings 3 and 4, so that the lever means 5 and 6 are axially non-displaceably mounted relative to the spring member 2.

Various modifications of the illustrative embodiment shown and described will be obvious to men skilled in the art, without departing from the scope of the invention. This refers particularly to the means whereby the levers 5 and 6 are non-rotatably connected to the fixing portions and rotatably mounted on the bearing portions of bushings 3 and 4, as well as to the shape and construction of the torsion spring member 2 and of the lever means 5 and 6.

I claim:

1. In a torsion spring assembly comprising a torsion spring, the combination of a first bushing and a second bushing fast on mutually opposite ends of said spring, each of said bushings comprising a peripheral cylindrical bearing portion surrounding said spring, and two lever means, one of which is non-rotatably connected to said first bushing and rotatably mounted on said bearing portion of said second bushing, whereas the other lever means is rotatably mounted on said bearing portion of said first bushing and non-rotatably connected to said second bushing.

2. In a torsion spring assembly comprising a torsion spring, the combination of a first bushing and a second bushing fast on mutually opposite ends of said spring, each of said bushings comprising a peripheral cylindrical bearing portion surrounding said spring and a peripheral fixing portion adjacent to said bearing portion and also surrounding said spring, and two lever means, one of which is non-rotatably connected to the fixing portion of said first bushing and rotatably mounted on said bearing portion of said second bushing, whereas the other lever means is rotatably mounted on said bearing portion of said first bushing and non-rotatably connected to the fixing portion of said second bushing.

3. In a torsion spring assembly the combination of a torsion spring composed of a plurality of nested parallel spring elements, a first bushing and a second bushing fast on mutually opposite ends of said spring and holding said spring elements together, each of said bushings comprising a peripheral cylindrical bearing portion surrounding said spring, and two lever means, one of which is non-rotatably connected to said first bushing and rotatably mounted on said bearing portion of said second bushing, whereas the other lever means is rotatably mounted on said bearing portion of said first bushing and non-rotatably connected to said second bushing.

4. In a torsion spring assembly the combination of a torsion spring of out-of-round cross section at least at its ends, a first bushing and a second bushing having an axial aperture conforming to the out-of-round cross section at the ends of said spring and fast on mutually opposite ends of said spring, each of said bushings comprising a peripheral cylindrical bearing portion surrounding said spring, and two lever means, one of which is non-rotatably connected to said first bushing and rotatably mounted on said bearing portion of said second bushing, whereas the other lever means is rotatably mounted on said bearing portion of said first bushing and non-rotatably connected to said second bushing.

5. In a torsion spring assembly comprising a torsion spring, the combination of a first bushing and a second bushing fast on mutually opposite ends of said spring, each of said bushings comprising a peripheral cylindrical bearing portion surrounding said spring, and two lever means, one of which is non-rotatably connected to said first bushing and rotatably mounted on said bearing portion of said second bushing, whereas the other lever means is rotatably mounted on said bearing portion of said first bushing and non-rotatably connected to said second bushing, one of said lever means engaging axially outwardly facing sides of both said bushings and the other of said lever means engaging axially inwardly facing sides of both said bushings.

6. In a torsion spring assembly comprising a torsion spring, the combination of a first bushing and a second bushing fast on mutually opposite ends of said spring, each of said bushings comprising a peripheral cylindrical bearing portion surrounding said spring, and two lever means each of which comprises two limbs connected for joint pivotal movement, one of said lever means being non-rotatably connected with one of its limbs to said first bushing and rotatably mounted with the other of its limbs on said bearing portion of said second bushing, whereas the other lever means is rotatably mounted with one of its limbs on said bearing portion of said first bushing and non-rotatably connected with the other of its limbs to said second bushing.

References Cited in the file of this patent

UNITED STATES PATENTS

| 2,194,964 | Willson | Mar. 26, 1940 |
| 2,203,095 | Kreissig et al. | June 4, 1940 |

FOREIGN PATENTS

| 52,759 | France | June 12, 1944 |
| 228,795 | Switzerland | Dec. 1, 1943 |